Nov. 2, 1937.   G. S. BOYD ET AL   2,098,027
EXTERMINATING DEVICE FOR BUGS AND INSECTS
Filed Jan. 27, 1937
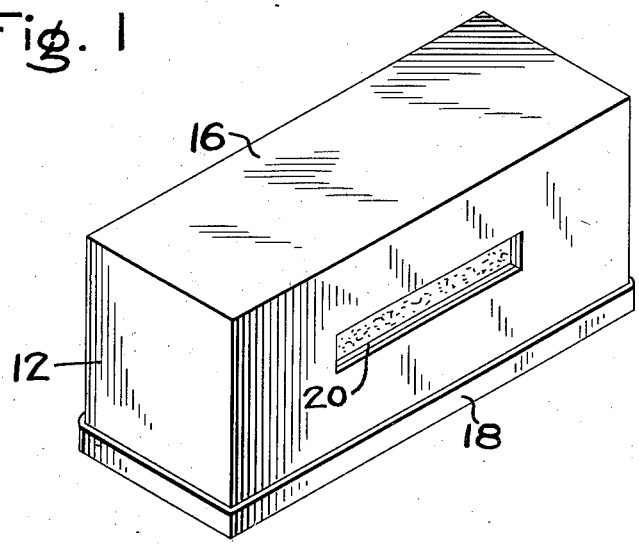
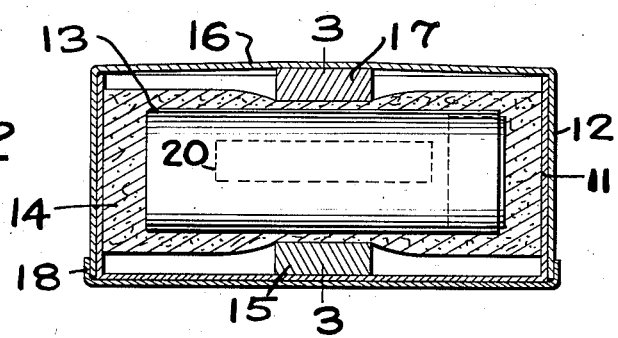
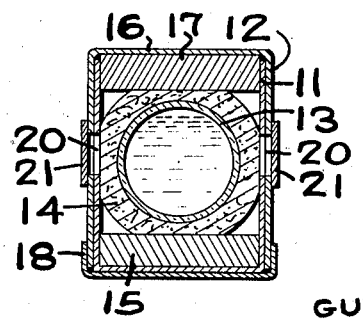
Inventors
GUY S. BOYD AND
STEPHEN H. BOYD
By Malcolm F. Gannett
Attorney Patented Nov. 2, 1937

2,098,027

UNITED STATES PATENT OFFICE 2,098,027

EXTERMINATING DEVICE FOR BUGS AND INSECTS

Guy S. Boyd and Stephen H. Boyd, York, Pa.

Application January 27, 1937, Serial No. 122,524

3 Claims. (Cl. 43—131)

This invention relates to devices of the type adapted to be used for destroying ants, bugs, insects and other pests, and more to an exterminating device of the type adapted to contain a poison in such a manner that the device is fool proof and ineffective until it is desired to destroy the insects, etc.

An object of the invention is to provide an improved exterminating device for ants, bugs, insects and other pests, in which a poison or other exterminating agent is contained in a vial or other vessel enclosed in a wrapper of absorbent material, the whole being disposed in a container in such a manner that when it is desired to exterminate the pests, etc., the vial can be easily broken so as to saturate the absorbent material enclosing the same with the poison and thereby render the device effective.

Another object of the invention is to provide an improved insect exterminating device of economical construction which is safe and certain as a container of poison where it might be accessible to other animals and even to children and which will prove exceptionally effective for the service for which it has been designed.

With the foregoing and other objects in view, the invention consists in the construction and arrangement of the several parts which will be hereinafter more fully described and claimed.

In the accompanying drawing:—

Figure 1 is a perspective view of an exterminating device constructed according to the present invention, showing the same in operative position, ready to attract ants, bugs, insects and other pests;

Fig. 2 is a vertical longitudinal section of the device as it is prepared for sale; and Fig. 3 is a vertical transverse section taken on the line 3—3 of Fig. 2.

The exterminating device comprises a box-like body constructed of cardboard or other inexpensive sheet material and including an inner or main body member 11 and an outer or cover 12, the cover 12 fitting snugly over the main body 11, as shown in Figs. 2 and 3.

Disposed within the container and supported in spaced relation from all of the walls thereof is a glass vial 13 adapted to contain some suitable poison which will kill ants, bugs, insects and the like when such pests consume a predetermined quantity of the poison.

The glass vial 13 is wrapped, so as to be entirely enclosed, in some suitable absorbent material 14, such as cotton or other cellulose material.

The vial 13 and its enclosing absorbent material 14 are supported in spaced relation from the bottom of the box by a block 15, constructed of wood or other suitable inexpensive material.

Between the top of the vial and its enclosing absorbent material 14, and the top 16 of the box, there is disposed another block 17.

When the parts are being assembled, the cover or outer portion 12 of the box is pressed firmly down upon the vial 13, absorbent material 14, and the blocks 15 and 17, and said cover is fixedly secured to the inner portion 11 of the box by applying a covering of adhesive paper or the like 18 to the adjoining edges of the two sections of the box. The completed package is thus sealed tight so that its contents are not readily accessible.

Preferably the sizes of the blocks 15 and 17 should be such that when the above described package is constructed, the top of the cover 12 will be bulged upwardly slightly (see Fig. 2) and the vial 13 will be tightly gripped between the two blocks 15 and 17. In this way the vial 13 will not shift its position during handling, and obviously since the vial is enclosed in the adsorbent material 14, such material will effectively protect the vial 13 from being broken or otherwise injured until it is desired to use the package for exterminating purposes.

In order that the ants, bugs, and other insects can have access to the interior of the device so as to feed on the poison therein, at convenient intervals, the side walls of the box are formed with openings 20. In the instant case openings 20 are shown formed in the two longitudinal side walls of the box (see Fig. 3), but it will be understood that other openings can be formed in any suitable portion of the box in accordance with the invention.

As shown in Fig. 3, the openings 20 are covered with a suitable strip of material 21, such as adhesive tape or the like. The strips 21 are disposed on the exterior of the box in such a manner that when it is desired to put the device into use, such strips can be readily torn or removed from the openings 20, thereby exposing the interior of the box, so that the insects can readily enter the box.

Assuming that the package is in the condition shown in Figs. 2 and 3, and it is desired to put same in use for the purpose of attracting and destroying ants, bugs, etc., the box can be placed on a floor, the ground, or any other firm support. The center of the top of the box is next struck with an implement, such as a hammer or the like.

This blow will fracture the vial 13, thereby spilling the contents thereof, and since said vial is entirely enclosed by the absorbent material 14, the latter will soak up the poison. With the coverings 21 removed from the openings 20, the saturated material 14 will now attract ants, bugs, or other pests who will feed upon the poison and will subsequently be exterminated. Obviously the air will slowly dry the saturated absorbent material 14, but since the poison remains in the material, it will long be effective, as will be understood.

From the foregoing it will be noted that the present invention provides an inexpensive and positive means for feeding poison to ants, bugs and other pests for the purpose of exterminating the same, and since the package is sturdily constructed and the joints thereof closely sealed, it provides a safe container for poison which is fool proof, in addition to being effective for the service for which it has been designed.

Having thus described our invention what we claim is:—

1. An exterminating device of the type described comprising a box, a vial of poison supported in spaced relation to the walls of said box, an absorbent material enclosing said vial and adapted to absorb poison from the vial when said vial is broken, means bearing against said vial and adapted to crush the same when the exterior of the box is struck by an implement, openings formed in said box to permit pests and the like to enter the same, and means detachably secured to the exterior of the box for closing said openings to prevent access to be had to the interior of the box until after the vial is broken.

2. A device of the class described comprising a box-like structure sealed on all surfaces, a vial of poison supported within the box and adapted to be broken to discharge the poison therefrom, means within the box for absorbing the poison when the same is discharged from the vial, openings formed in said box to permit ants, pests and the like to enter said box, and means covering said openings and adapted to be removed therefrom when said vial has been broken and the poison discharged therefrom.

3. A device of the class described comprising a box composed of inner and outer sections, said outer section enclosing the inner section, means for sealing the adjoining edges of the two sections of the box, a vial of poison disposed within the box, a wrapper of absorbent material enclosing said vial, a block disposed beneath said vial and supporting the same in spaced relation from the bottom of the box, a second block overlying said vial and disposed between the vial and the top of the box, both of said blocks being disposed substantially in vertical alinement with each other and said blocks being adapted to grip the vial and retain the same rigidly in position within the box between the top and bottom thereof, an opening formed in a wall of the box, and detachable means covering said opening and adapted to be removed when it is desired to expose the interior of the box.

GUY S. BOYD.
STEPHEN H. BOYD.